United States Patent
Kanesaka et al.

(10) Patent No.: US 7,733,538 B2
(45) Date of Patent: Jun. 8, 2010

(54) IMAGE READING APPARATUS

(75) Inventors: Yoshinori Kanesaka, Suwa (JP);
Toshiaki Oshima, Suwa (JP); Hiroshi Yabe, Suwa (JP); Yutaka Tanaka, Fuefuki (JP); Mitsuhiro Ishihara, Yamanashi-ken (JP)

(73) Assignees: Seiko Epson Corporation, Tokyo (JP);
Nisca Corporation, Yamanashi (JP)

( * ) Notice: Subject to any disclaimer, the term of this patent is extended or adjusted under 35 U.S.C. 154(b) by 1508 days.

(21) Appl. No.: 11/061,724

(22) Filed: Feb. 22, 2005

(65) Prior Publication Data

US 2005/0200917 A1 Sep. 15, 2005

(30) Foreign Application Priority Data

Feb. 20, 2004 (JP) ............................. 2004-044523

(51) Int. Cl.
*H04N 1/04* (2006.01)

(52) U.S. Cl. ...................... 358/474; 358/497; 358/475; 358/509; 358/468; 250/208.1; 348/314; 348/296; 399/364; 399/367

(58) Field of Classification Search ................ 358/474, 358/497, 505, 3.27, 475, 509, 494, 487, 506, 358/409, 468, 488, 527, 514, 515, 408; 250/208.1, 250/234; 348/314, 296, 316, 295; 399/364, 399/367, 371, 374
See application file for complete search history.

(56) References Cited

U.S. PATENT DOCUMENTS

| | | | | |
|---|---|---|---|---|
| 4,989,099 A * | 1/1991 | Koshiyouji et al. | ......... | 358/474 |
| 5,289,000 A * | 2/1994 | Toyofuku | ................... | 250/234 |
| 5,763,892 A * | 6/1998 | Kizaki et al. | ............. | 250/492.1 |
| 5,781,311 A * | 7/1998 | Inoue et al. | .................. | 358/475 |
| 5,822,087 A * | 10/1998 | Tsai | ............................ | 358/475 |
| 6,259,113 B1 * | 7/2001 | Funabashi | ................... | 250/588 |
| 6,489,602 B1 * | 12/2002 | Wang et al. | .............. | 250/208.1 |
| 6,831,759 B1 * | 12/2004 | Witte et al. | ................. | 358/474 |
| 6,906,830 B1 * | 6/2005 | Hayashi | ....................... | 358/474 |
| 7,027,194 B2 * | 4/2006 | Kanda | ......................... | 358/496 |
| 7,142,335 B2 * | 11/2006 | Tesavis | ....................... | 358/474 |
| 7,164,510 B1 * | 1/2007 | Nagano | ...................... | 358/487 |
| 7,173,234 B2 * | 2/2007 | Hiromatsu | .................. | 250/226 |
| 7,378,644 B2 * | 5/2008 | Kubota et al. | ............... | 250/234 |
| 7,389,925 B2 * | 6/2008 | Wei | ............................. | 235/454 |

(Continued)

FOREIGN PATENT DOCUMENTS

JP 2003-158611 5/2003

*Primary Examiner*—Negussie Worku
(74) *Attorney, Agent, or Firm*—Westerman, Hattori, Daniels & Adrian, LLP

(57) ABSTRACT

There are provided a platen on which an original is mounted, a line sensor that performs photoelectric conversion on light from the original on the platen, a first carriage that moves along the platen and guides the light from the original to the line sensor, a first housing that stores and supports the first carriage to be movable along the platen, first driving means for moving the first carriage, a second carriage provided with a plurality of rod-shaped light-source lamps that applies light to the original, a second housing that stores and supports the second carriage to be movable along the platen and covers the platen, second driving means for moving the second carriage, and control means for controlling the first driving means, the second driving means and lighting of the plurality of light-source lamps.

8 Claims, 6 Drawing Sheets

U.S. PATENT DOCUMENTS

| | | | |
|---|---|---|---|
| 7,433,092 B2 * | 10/2008 | Spears et al. | 358/474 |
| 2002/0003703 A1 * | 1/2002 | Chen | 362/293 |
| 2002/0036809 A1 * | 3/2002 | Tohyama et al. | 358/498 |
| 2002/0039207 A1 * | 4/2002 | Kanda | 358/498 |
| 2003/0063333 A1 * | 4/2003 | Boll | 358/494 |
| 2005/0083557 A1 * | 4/2005 | Nagano | 358/487 |

* cited by examiner

IMAGE READING APPARATUS

BACKGROUND OF THE INVENTION AND RELATED ART STATEMENT

The present invention relates to an image reading apparatus which reads an original mounted on a platen with a line-shaped photoelectric conversion element that moves along the platen, and more particularly, to an image reading apparatus provided with a transmissive light source unit which applies light from a light source unit to a transparent or translucent transmissive original mounted on a platen and reads an amount of transmission light with a photoelectric conversion element.

In general, an image reading apparatus, which scans and electrically reads an original mounted on a transparent platen such as glass with a line sensor such as a CCD and C-MOS sensor, has widely been applied to a facsimile, scanner and the like. A light source that applies light to an original on the platen is integrally attached to a carriage provided with optical elements to form an image on the line sensor, and an image of the original is read while the carriage is moved.

However, such an apparatus cannot accurately read a transparent (translucent) original such as a photograph and OHP because light from the light source passes through the original, and therefore, an apparatus has recently been known in which a light source unit is provided above a platen that is different from a side (under the platen) where a sensor is arranged, and light passed through the original from above to under is read with a photoelectric sensor. It is known that such an apparatus that reads a translucent film such as film has a structure where a light source unit is mounted on a carriage on one side of a platen while a reading optical unit is mounted on another carriage on the other side, the carriages are arranged to allow them to reciprocate in the subscanning direction along the platen, and an image is read while both the carriages are moved at the same speed in synchronization with each other.

However, it has recently been required to switch emission amounts of the light source corresponding to types of originals so as to read different types of originals, for example, negative film and positive film, with high precision in the same apparatus. For switching a plurality of provided source lamps, a mechanism has conventionally been known that switches light-source lamps with different wavelengths such as an R (Red) lamp, G (Green) lamp and B (Blue) lamp for an original with a color image, and proposed, for example, in Patent Document 1 (JP2003-158611). The Document 1 discloses a mechanism where a plurality of light-source lamps is provided to be movable inside a light-source carriage that moves along the platen, and the light-source lamps are switched by moving a position of a lamp holder provided with the plurality of light-source lamps, irrespective of a moving (scanning) mechanism of the light-source carriage.

[Patent Document 1] JP2003-158611 (FIG. 3)

When one is selected to switch from a plurality of light-source lamps corresponding to the type of original in applying light to a translucent original such as film and reading the light passed through the original with a photoelectric sensor, applying the mechanism as described in Patent Document 1 causes following problems: In the mechanism of the Document, a light-source carriage moving along the platen is provided with driving means for supporting a plurality of light-source lamps to be movable and moving the light-source lamps. Accordingly, the apparatus needs to be provided with mechanisms for supporting respectively a carriage (reading carriage) mounted with a photoelectric sensor, a carriage (light-source carriage) mounted with a light source unit, and a lamp holder mounted with lamps inside the light-source carriage, and with respective driving mechanisms.

Therefore, in addition to increased complexity and size in the apparatus, there are risks that distortion and/or color shading may develop on a read image when displacement occurs on three moving mechanisms due to rattling and impact. Further, since an emission amount of the light-source lamp has a parabolic characteristic in the subscanning direction of the line sensor, when misalignment occurs in switching the lamps or the characteristic of the emission amount shifts due to exhaustion of the lamp during the use on each of convertible light-source lamps, it is not possible to compensate for such misalignment or shift, and there is a fear that the read image may deteriorate with time.

Then, the present invention aims to switch light-source lamps by controlling movements of a carriage mounted with the light-source lamps in reading a translucent original (transmissive original) by moving the light-source carriage and the reading carriage so as to enable switching of the light-source lamps corresponding to types of originals without using a specific lamp switching mechanism. Accordingly, it is an object of the present invention to provide an original reading apparatus capable of reading an image with an amount of light corresponding to the type of original with a simplified structure. It is another object of the invention to provide an image reading apparatus, such as an image reading apparatus of a computer or the like, which is capable of executing at high speed a series of processing of selection of original type, light source setting, and image reading.

SUMMARY OF THE INVENTION

In order to achieve the aforementioned objects, the present invention adopts following constitutions.

Provided are a platen on which an original is mounted, a line sensor that performs photoelectric conversion on light from the original on the platen, a first carriage that moves along the platen and guides the light from the original to the line sensor, a first housing that stores and supports the first carriage to be movable along the platen, first driving means for moving the first carriage, a second carriage provided with a plurality of rod-shaped light-source lamps that applies light to the original, a second housing that stores and supports the second carriage to be movable along the platen and covers the platen, second driving means for moving the second carriage, and control means for controlling the first driving means, the second driving means and lighting of the plurality of light-source lamps, where the plurality of light-source lamps is spaced in parallel with one another in the moving direction of the second carriage, and due to a signal from means for selecting a single light-source lamp from the plurality of light-source lamps corresponding to the type of the original, the control means controls to move the first carriage from a standby position to a predetermined position, furthermore the second carriage from a standby position by an amount of movement set corresponding to the selected light-source lamp to position in the predetermined position, and then, move the first carriage and the second carriage at the same speed from the predetermined position to a reading start position of the original.

It is thereby possible to move a reading area in synchronization with the movement of the first carriage concurrently with switching of light sources by moving the second carriage mounted with a plurality of light sources in one direction.

The control means controls movements of the second carriage so that the second carriage moves in one direction along the platen from the standby position to the reading start position via the predetermined position, and positions one of the plurality of light-source lamps in a predetermined position by an amount of the movement from the standby position to the predetermined position. It is thus possible to position the carriage in an accurate position by rotation driving in one direction without rotating forwardly and reversely a driving motor that drives the carriage.

The second carriage is provided with a plurality of lamp storing portions divided by partition walls to respectively store the plurality of light-source lamps, and each of the plurality of lamp storing portions is provided with a reflecting plate that diffusely reflects light of a respective light-source lamp and with an opening to project the light toward the platen. By this means, the light of light sources is diffused and fluctuations on amounts of the light are reduced.

In a configuration provided with light sources at least for negative film and positive film as a plurality of light sources, amounts of light with wavelengths for R, G and B of the light source for negative film are set so that R:G:B=1:2:3 in output values of the line sensor, while amounts of light with wavelengths for R, G and B of the light source for positive film are set so that R:G:B=1:1:1 in output values of the line sensor. This is because the negative film is reddish, and setting the aforementioned ratios with reference to output values of the line sensor allows reading of images with excellent color reproducibility.

In the process for moving the first carriage and the second carriage from the predetermined position to the reading start position, the control means makes the line sensor acquire a reference reading signal. It is thereby possible to perform, in a series of operation, switching of light sources by moving both the carriages from the standby position to the reading start position, reading of white reference values, and alignment of the first and second carriages in the reading start position, and image reading can be carried out more promptly.

In the present invention, a plurality of light sources is switched by the movement in the subscanning direction of the second carriage moving in synchronization with the first carriage, and therefore, the need is eliminated for using a specific lamp switching mechanism for a plurality of light sources. Accordingly, it is possible to provide an image reading apparatus capable of reading originals using appropriate light sources corresponding to types of the originals in a simplified structure, and achieving more excellent color reproducibility (obtaining excellent image data).

Further, by switching to one of the plurality of light-source lamps in the process for moving the second carriage provided with the light source from the standby position to the reading start position or an alignment position toward the start position, there are provided effects such that a main body apparatus such as a computer is capable of efficiently performing a series of operation including setting of the type of original, switching of light-source lamps and image reading.

DETAILED DESCRIPTION OF PREFERRED EMBODIMENT

Figure 1:
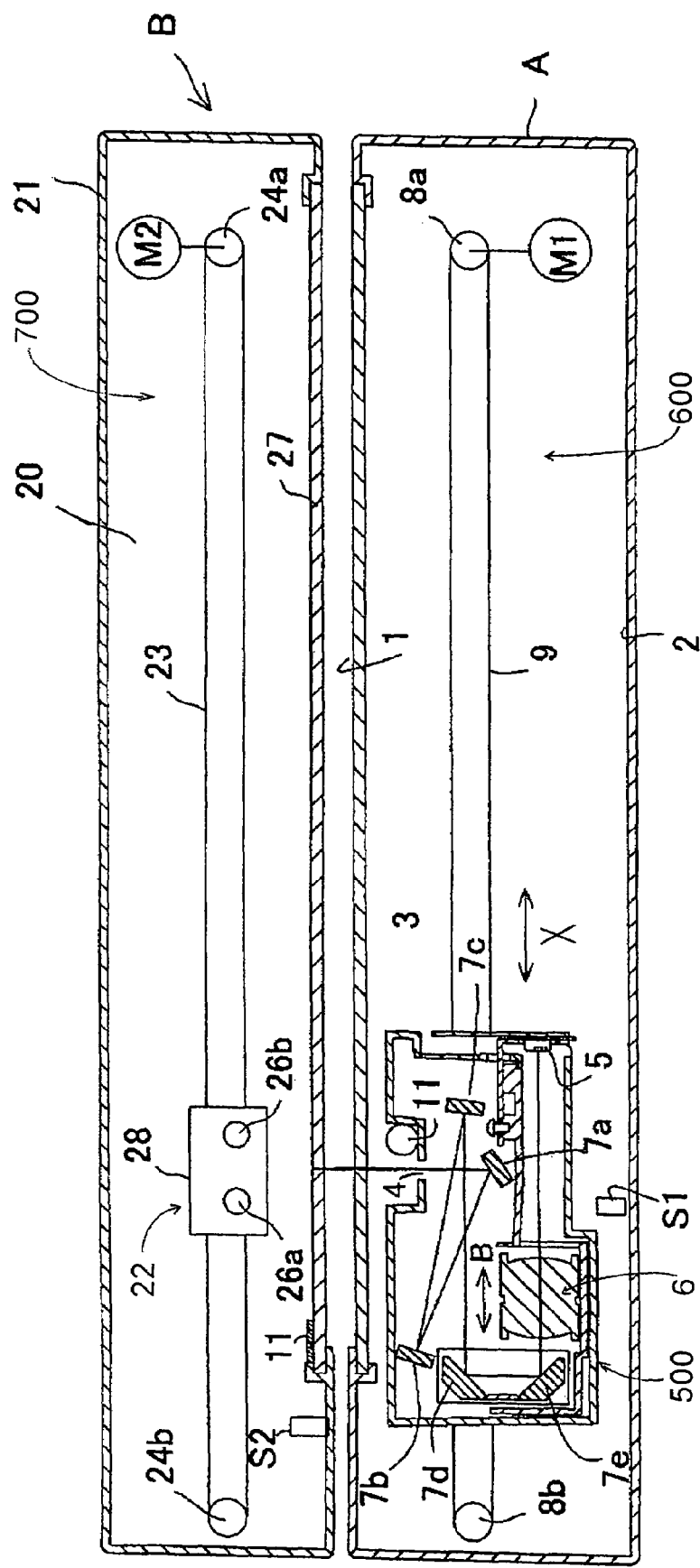
FIG. 1 is a central longitudinal sectional view of an image reading apparatus illustrating one embodiment of the present invention.
Figure 2:
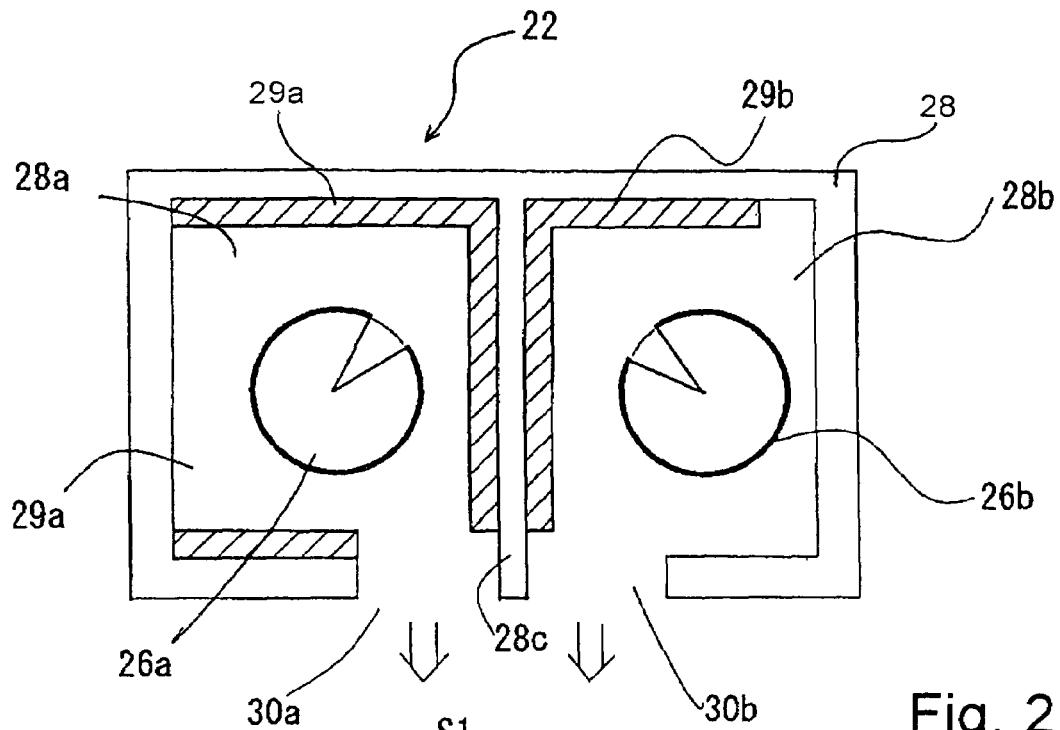
FIG. 2 is an explanatory view illustrating a configuration of a light source unit of FIG. 1.
Figure 2:
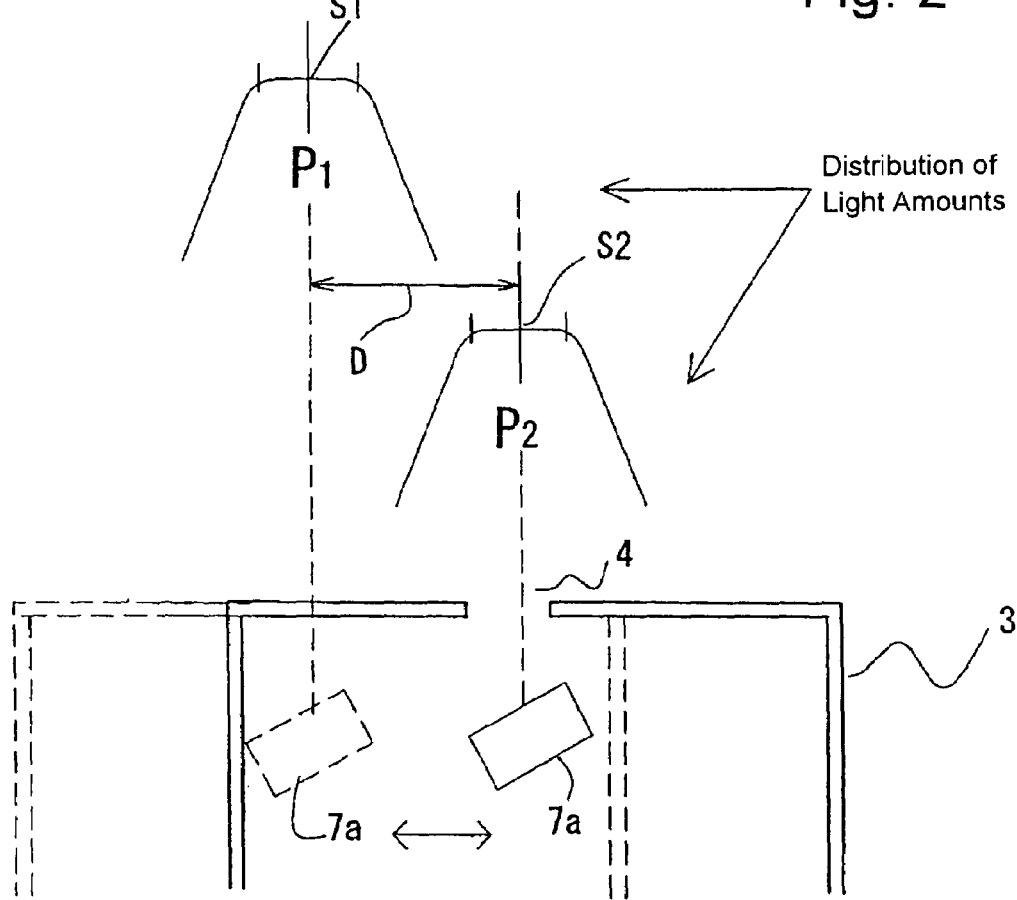
Figure 3:
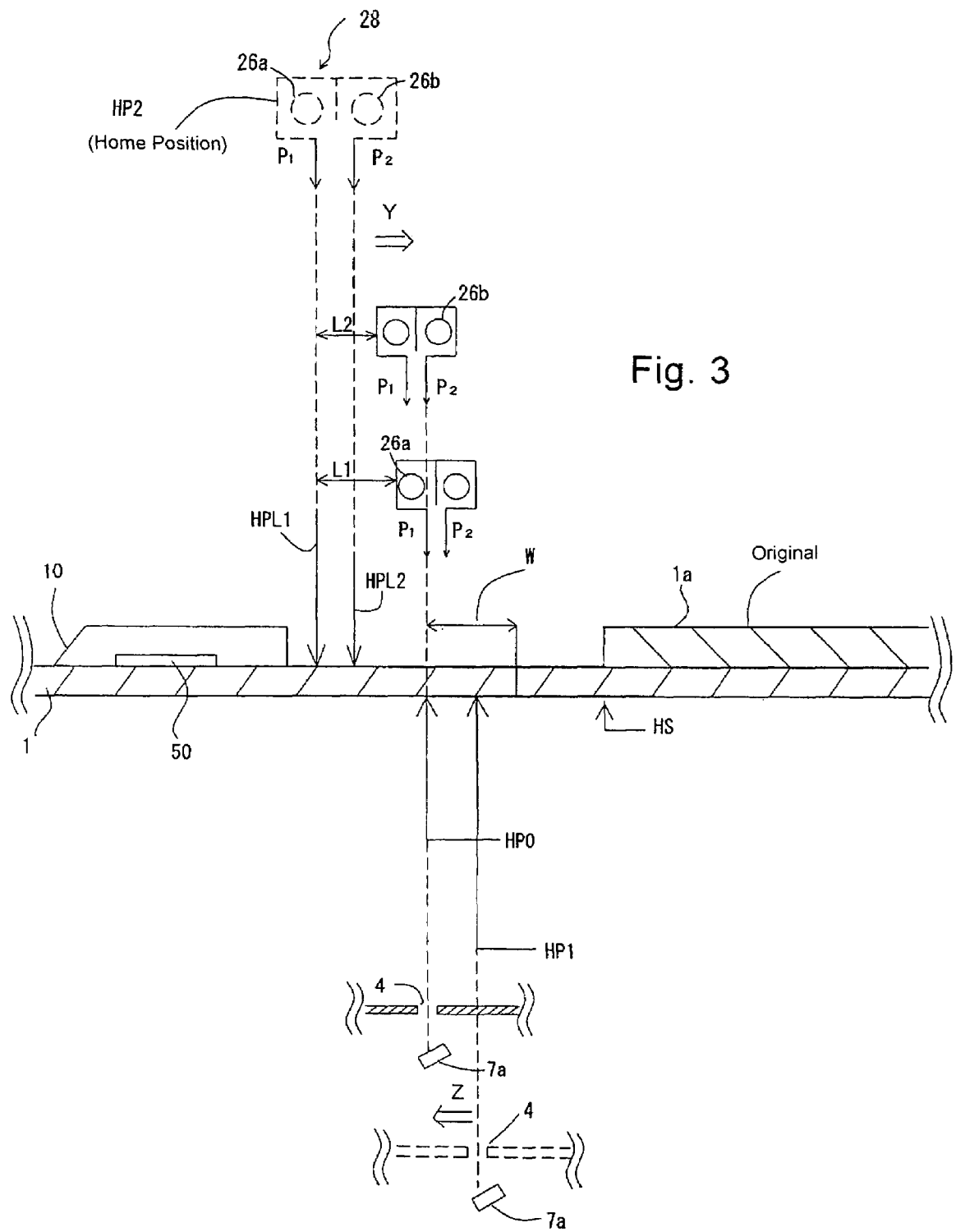
FIG. 3 is an explanatory view illustrating a positional relationship between a first carriage and a second carriage of FIG. 1.

The present invention will specifically be described below with reference to a preferred embodiment as shown in drawings. FIG. 1 is a sectional view illustrating the entire image reading apparatus. FIG. 2 is an explanatory view illustrating a light source unit and a reading unit. FIG. 3 is an explanatory view illustrating a positional relationship between the light source unit and the reading unit. First, an image reading apparatus is explained. The image reading apparatus used as a copier, facsimile, or scanner is generally constructed as a system of a combination of different functional units such as a print unit and image transmission unit corresponding to the use. The apparatus as shown in the figure indicates a scanner used as an input apparatus of a computer or the like.

The image reading apparatus as shown in FIG. 1 is comprised of a scanner section A and a transmissive light source section B. The scanner section A is comprised of a platen 1 on which an original is mounted, a casing (first housing) 2 having the platen 1 in a part thereof, a first carriage 3 incorporated into the casing to be movable, and a reading unit 500 mounted on the first carriage 3.

The platen 1 is formed of a transparent plate member such as glass and configured to be a plane with a width (direction from front side to back side in FIG. 1) and length (direction of the arrow X in FIG. 1) to mount a maximum original. The platen 1 is attached to an upper surface of the casing 2, and the casing 2 is formed in the appropriate shape of a box by resin mold. The casing 2 is divided into two parts to incorporate the reading unit 500 thereinto, and an upper case and a lower case are formed separately, and combined generally after incorporating structural components thereinto. The reading unit 500 is configured by incorporating a photoelectric sensor 5, an image formation lens 6 and reflecting mirror group 7 into the box-shaped first carriage 3 provided with an opening 4 through which the light from the original on the platen 1 is incident.

The carriage 3 is generally formed in the appropriate shape of a box by resin mold. Polyphenylene oxide (PPO), PPE (Modified PPO) and the like are used as a resin material, and glass fibers are added to the resin to enhance strength and reduce thermal expansion. Used for the carriage as shown in the figure is a resin material with a thermal expansion coefficient of about $31 \times 10^{-6}/°C$. obtained by adding 50% of glass fibers to PPO. Further, to prevent diffuse reflection of light, a black pigment such as carbon is added to the resin material. Accordingly, the box-shaped first carriage 3 prevents intrusion of dust, and at the same time, prevents intrusion of light from outside, while preventing the light from the original from being reflected diffusely.

To the first carriage 3 configured as described above are attached reflecting mirrors 7a, 7b, 7c, 7d and 7e, a light-gathering lens 6 and the photoelectric sensor 5 as described below. The light from the original mounted on the platen 1 is guided to the lens 6 by the group of a plurality of mirrors 7. Reflecting mirrors of the group 7 as shown in the figure have substantially the same shape, are plane-shaped mirrors of glass material, formed in the shape of a rectangle, and fixed at their opposite ends to side walls of the first carriage 3. The reflecting mirror group 7 is formed in a length of effective reading width (that is the direction from front side to back side in FIG. 1 and the main scanning direction of the line sensor) of a reading area on the platen 1, and bends the light guided from the original on the platen 1 via the opening 4 to guide to the light-gathering lens 6. The reflecting mirror group 7 bends the optical path from the original to the lens 6, and thereby aims to reduce the size of the carriage. The light-gathering lens 6 is comprised of a lens array that forms an image of light received from the reflecting mirror on the photoelectric sensor 5 located rearward, and is incorporated into a resin lens barrel. The lens 6 is fixed to a bottom wall of the first carriage 3 with screws or the like.

A configuration of the photoelectric sensor 5 will be described below based on FIG. 4. The photoelectric sensor 5 has a plurality of line sensors with a number of photoelectric conversion elements corresponding to the resolution arranged in the shape of a line, and electrically reads an image of the original. Accordingly, the line direction of the photoelectric sensor 5 is the main scanning direction. The sensor 5 as shown in the figure is comprised of a sensor array 51 having three, R (Red), G (Green) and B (Blue), line sensors, and a color film of R, G, or B is bonded to a light-receptive surface of each of the line sensors. By the color filter films and spectral sensitivity characteristics of the line sensors, the sensors have characteristics for performing photoelectric conversion on light with wavelengths of about 400 nm to 540 nm for R, about 480 nm to 600 nm for G, and 590 nm to 720 nm for B.

Figure 4:
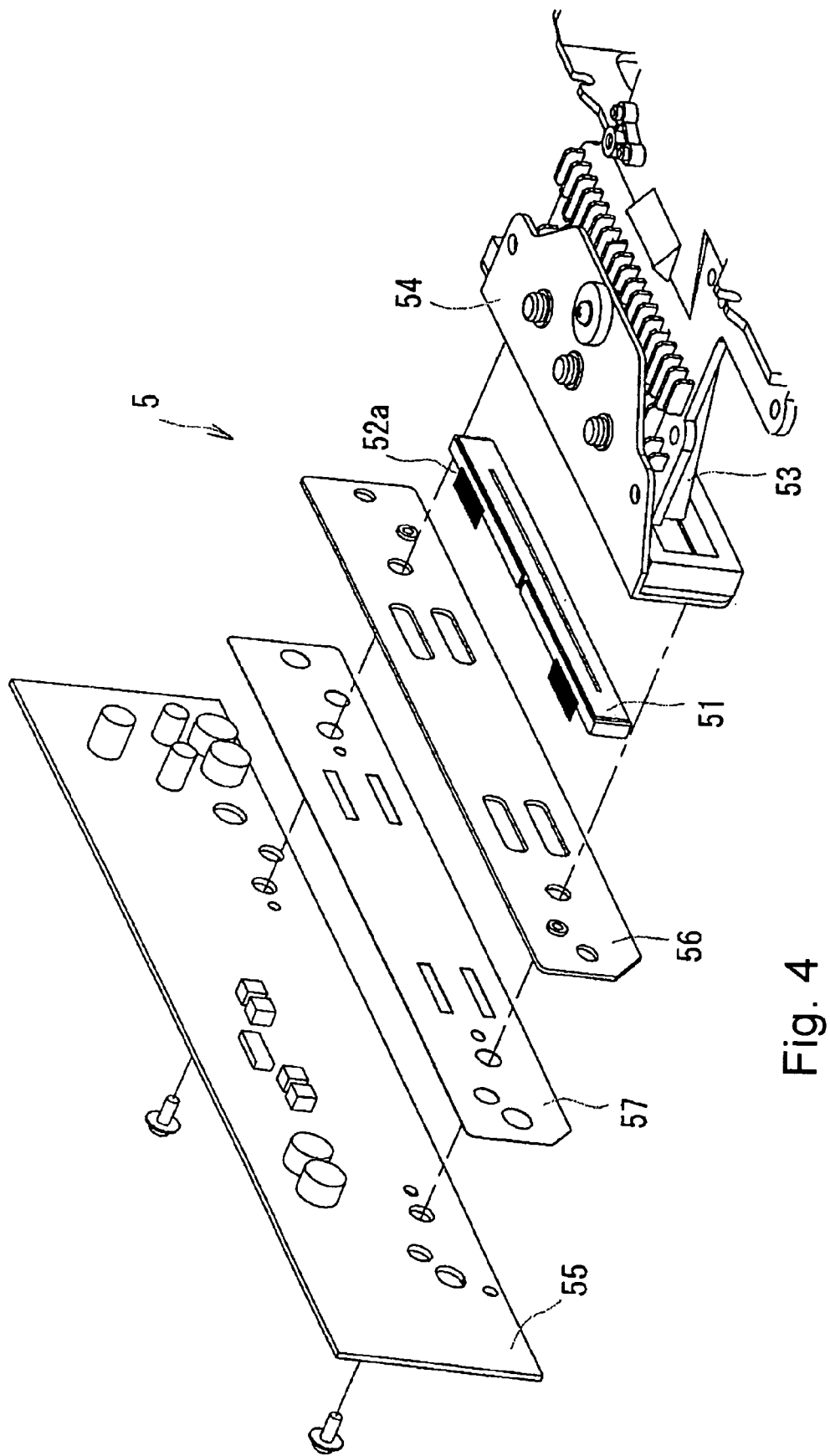
FIG. 4 is an exploded perspective view illustrating a configuration of a photoelectric sensor 5 of FIG. 1.

As shown in FIG. 4, the sensor array 51 is attached to a sensor support plate 53, and "52a" in the figure are lead terminals to remove the charge to the outside. To the sensor support plate 53 is fixed an L-shaped cross section plate 54 made of metal (general steel or low-rigidity alloy plate) with a plurality of screws. A sensor board 55 to which the sensor array 51 is fixed is fixed to the L-shaped plate 54 by screws. The sensor array 51 is fixed to wiring of the sensor board 55 with copper wire 52a, and a radiator plate 56 made of metal is disposed between the sensor board 55 and sensor array 51. The radiator plate 56 comes into contact with a bottom surface of the sensor array 51 and releases the heat generated in the sensor array 51 to the outside. Further, an insulating sheet 57 is disposed between the radiator plate 56 and sensor board 55 to electrically insulate. Then, the board 55, insulating sheet 57, radiator plate 56 and sensor array 51 are fixed to the L-shaped plate 54 with screws 58. The L-shaped plate is fixed to the first carriage 3.

The first carriage 3 configured as described above is supported by the casing 2 of the scanner section A to be movable in the direction of the arrow X in FIG. 1. A pair of guide members each in the shape of a shaft or rail are provided along the platen 1 in the casing 2, and bearing portions formed in the first carriage 3 are engaged in the guide members and supported. With respect to such a structure, various types are well known and descriptions thereof are omitted. In the casing 2 is provided first driving means for moving the first carriage 3 along the guide members. The first driving means 600 as shown in the figure is comprised of a stepping motor (hereinafter, referred to as a first driving motor) M1, a timing belt 9 disposed in parallel along the platen 1, and a pair of pulleys 8a and 8b that support the belt, and the timing belt 9 is driven in the direction of the arrow X in FIG. 1 via the pulley 8a coupled to an output axis of the first driving motor M1. The timing belt 9 is fixed at its one portion to the first carriage 3, and the first carriage 3 reciprocates in the direction of the arrow X in FIG. 1 by forward and reverse rotations of the first driving motor M1.

A reflective light source 11 that applies light from under the platen 1 is attached to an external wall of the substantially box-shaped first carriage 3 near the opening 4. When a non-transmissive general sheet original (reflective original) is set on the platen 1, the reflective light source 11 is lighted, and the light reflected by the original is guided to the lens 6 through the opening 4 and read by the photoelectric sensor 5. Such a structure is widely known. The reflective light source 11 as shown in the figure is comprised of a rod-shaped fluorescent lamp with inert gas such as xenon encapsulated therein, and attached in parallel to the main scanning direction of the photoelectric sensor 5.

A position sensor S1 is provided in the casing 2 to determine a position of the first carriage 3. The sensor S1 is comprised of a photo-sensor or limit sensor, and detects whether the first carriage 3 exists in a sensor installation position. The sensor S1 as shown in FIG. 1 is disposed in a position to detect the first carriage 3 positioned in the home position (standby position), but may be disposed in any position in a range of reciprocation of the first carriage 3. The platen 1 is provided at its end face with a reference plate 10 comprised of steps, and in reading a reflective original, the original is applied to the reference plate 10 for register.

A transmissive light source section B with the following configuration is installed above the platen 1. The transmissive light source section B is comprised of a housing 20 that covers the entire reading area of the platen 1, a light source unit 22 stored in the housing, guide means for supporting the light source unit 22 to allow the unit 22 to reciprocate along the platen 1, and driving means.

The housing (second housing) 20 is comprised of a casing 21 that covers the entire platen 1, or at least the reading area set on the platen. The casing 21 is formed of the same material as that of the casing 2 of the scanner section A. The casing 21 is attached to the casing 1 at its one side on the depth side in FIG. 1 with an open-close hinge not shown. Lifting the casing 21 upwardly in FIG. 1 releases an upper portion of the platen 1, while closing the casing 21 to be a state as shown in FIG. 1 covers the upper portion of platen 1 and shields light.

The casing 21 is provided with a transparent glass plate 27 in a position overlapping the platen 1. As shown in FIG. 2, the light source unit 22 is comprised of a second carriage 28, a first light source lamp 26a and second light-source lamp 26b stored in the carriage, and reflecting plates 29a and 29b that reflect light from the lamps. The second carriage 28 is, as in the first carriage 3, formed by molding the resin material of PPO with 50% of glass fibers added thereto, and has space (storage portion) therein to store the first and second light-source lamps 26a and 26b. The inside of the second carriage 28 is divided by a partition wall 28c into a first storage portion 28a and a second storage portion 28b to respectively store a plurality of light-source lamps, 26a and 26b, and each storage portion is provided with an opening 30a or 30b to apply light. Each of the first and second light-source lamps 26a and 26b is formed of a rod-shaped lamp longitudinal in the main scanning direction, and the length is formed to be longer than the width (length in the main scanning direction of the photoelectric sensor 5) of the reading area of the platen 1.

Each of the first and second light-source lamps 26a and 26b uses a fluorescent lamp with inert gas such as xenon encapsulated therein, and the first light-source lamp 26a supports negative film originals, while the second light-source lamp 26b supports positive film original. This is because the negative film is reddish, and has characteristics that light transmittance decreases in descending order of wavelength, and the light is getting hard to pass in order of R, G and B. Meanwhile, the positive film has almost the same transmission characteristic on R, G and B. Therefore, an output ratio of the first light source lamp 26a (for negative film) is varied with wavelengths of light, and with reference to an output value of the photoelectric sensor 5, the output ratio of R, G and B is set at substantially 1:2:3, while an output ratio of R, G and B for the second light-source lamp 26b (for positive film) is set at 1:1:1. Accordingly, by switching between the first and second light-source lamps corresponding to the original (negative film or positive film) to read, it is possible to read images of originals faithfully irrespective of characteristics of film material.

The first and second light-source lamps 26a and 26b are supported at their opposite end portions by the storage portions (28a and 28b as shown in FIG. 2, respectively) formed in the second carriage 28, and a reflecting plate 29a comprised of a plurality of white film plates is attached to almost the entire inner wall of the storage portion 28a for the negative film, while a reflecting plate 29b comprised of the same material is attached to part of the inner wall of the storage portion 28b for the positive film. Circumferences of the first and second light-source lamps are covered with masking, and an irradiation opening of about fifteen degrees to apply light is formed in part of each masking. In order for light applied from each irradiation opening to head to each reflecting plate (29a and 29b), the first light-source lamp 26a is attached with the irradiation opening thereof directed toward upper right, while the second light-source lamp 26b is attached with the irradiation opening thereof directed toward upper left, as viewed in FIG. 2. Accordingly, the first and second light-source lamps apply light only in the direction of reflecting plates 29a and 29b, respectively, and prevent light from being directly projected on an original on the platen 1.

On the second carriage 28, an opening 30a is formed to cause the light from the first light-source lamp 26a diffusely reflected by the reflecting plate 29a to head to the platen 1 side, and similarly, an opening 30b is formed on the second light-source lamp 26b side. The distance between the first light-source lamp 26a and the reflecting plate 29a disposed on the partition wall 28c is set shorter than the distance between the second light-source lamp 26b and the reflecting plate 29b disposed on the partition wall 28c. Inverters 106 and 107 (see FIG. 5) to supply high-frequency currents are respectively coupled to the first and second light-source lamps 26a and 26b, and thus, the same power is supplied to both the light-source lamps.

Distributions of light amounts in the subscanning direction of the light-source lamps as shown in FIG. 2 will be described below. The light-source lamps 26a and 26b are spaced and supported in the subscanning direction, have light amounts with parabolic characteristics as shown in the figure, and are provided with regions S1 and S2 under openings 30a and 30b where predetermined light amounts (sensor output values) required for reading are obtained, and the light amounts decrease as the distance from the opening 30a or 30b increases in the subscanning direction, respectively. The regions S1 (light-source lamp 26a) and S2 (light-source lamp 26b) to obtain an almost constant light amount of the light-source lamp 26a or 26b are spaced the distance D apart in the subscanning direction. The opening 4 of the first carriage 3 is positioned in the region S1 in lighting the first light-source lamp 26a (hereinafter, referred to as a negative-lamp) to read, while being positioned in the region S2 in lighting the second light-source lamp 26b (hereinafter, referred to as a positive-lamp) to read, and it is thus necessary to vary the relative position between the first carriage 3 and second carriage 28 corresponding to the light-source lamp to light (reading mode).

In addition, in this embodiment, center positions of the regions S1 and S2 where predetermined light amounts are obtained are respectively assumed to be a negative irradiation position P1 and positive irradiation position P2, and control is carried out such that the center of the opening 4 is in the position of the positive irradiation position P2 as shown by solid lines in lighting the positive-lamp 26b to read positive film, and that the center of the opening 4 is in the position of the negative irradiation position P1 as shown by doted lines in lighting the negative-lamp 26b to read negative film. By thus using center positions P1 and P2 respectively of regions S1 and S2 to obtain parabolic almost constant light amounts as references (design values) of alignment of the first and second carriages 3 and 28, it is possible to absorb mechanical errors or the like.

The second carriage 28 is supported by a pair of guide members (not shown) provided in the casing 21 to be allowed to reciprocate in the side-to-side direction as viewed in FIG. 1, and as in the first carriage 3, various methods are well known for such a structure, and therefore, omitted. The second carriage 28 supported by the casing 21 to be slidable is provided with second driving means 700 for moving the second carriage 28 to reciprocate in the subscanning direction. The second driving means 700 is comprised of a second driving motor M2, a pulley 24a, a pulley 24b on the opposite side paring with the pulley 24a, and a timing belt 23 provided between pulleys 24a and 24b, and its structure is the same as that of the first carriage 3. The second driving motor M2 is also comprised of a stepping motor. In addition, "S2" shown in the figure denotes a sensor to determine a home position of the second carriage 28.

Control of movements of the first carriage 3 and second carriage 28 will be described below based on FIG. 3. The first and second carriages are respectively driven by first and second driving motors M1 and M2, and each of the driving motors M1 and M2 is comprised of a stepping motor, and capable of performing control for moving the respective carriage to the predetermined position (alignment position) with a supplied pulse current. The home position (standby position) of each of the carriages 3 and 28 is determined with reference to a detection signal of the sensor S1 or S2, respectively, and upon obtaining an original reading start signal, the carriages 3 and 28 move from respective home positions to the reading area on the platen.

In FIG. 3, on the platen 1, the reading area 1a lies on the right side, while the reference plate 10 to which a reflective original is applied lies on the left side. The home position of the first carriage 3 is set at HP1, while the home position of the second carriage 28 is set at HP2, and at this point, the negative irradiation position P1 is situated in HPL1, while the positive irradiation position P2 is situated in HPL2. In addition, HPO as shown in the figure is the predetermined position (hereinafter, referred to as an alignment position) where the first and second carriages 3 and 28 are opposed to each other. The first and second carriages 3 and 28 are set in different home positions, move to the predetermined alignment position from the home positions, are aligned to face each other in the alignment position, and subsequently, move to a reading start position on the platen in synchronization with each other.

Accordingly, the alignment position may be set at a reading start position on the platen, at a position in agreement with the home position HP1 of the first carriage 3, or at a position in agreement with the home position HP2 of the second carriage 28, and when the alignment position is made agree with the home position of the second carriage, it is preferable to make the alignment position agree with HPL1 of the first light source, or with HPL2 of the second light source. In FIG. 3, the alignment position is set toward the reading start position HS on the platen, and each position is set so that the photoelectric sensor 5 of the first carriage 3 acquires white reference data during the period of time the carriage moves from the alignment position to the reading start position.

Meanwhile, with respect to the second carriage 28, the home position HP2, alignment position HPO, and reading start position HS are arranged in this order in one direction (rightward in FIG. 3) along the platen.

Movements of each carriage as shown in the figure will be described below. The first carriage 3 is set to move leftward in FIG. 2 from the home position HP1 by driving of the first driving motor M1 to reach the alignment position HPO, while the second carriage 28 is set to move rightward in FIG. 2 from the home position HP2 by driving of the second driving motor M2 to reach the alignment position HPO. At this point, the second driving motor M2 of the second carriage 28 makes distances to move different between the case of selecting the negative-lamp 26a and the case of selecting the positive-lamp 26b. In other words, as shown in FIG. 3, the power source pulse supplied to the second driving motor M2 (stepping motor) is controlled so that the second carriage 28 moves by the distance L1 when the negative-lamp 26a is selected, while moving by the distance L2 when the positive-lamp 26b is selected. The center of the opening 4 of the first carriage 3 agrees with the negative irradiation position P1 when the second carriage 28 moves by the distance L1, while agreeing with the positive irradiation position P2 when the second carriage 28 moves by the distance L2. Concurrently with the movement, lighting either the negative-lamp (first light-source lamp) 26a or the positive-lamp (second light-source lamp) 26b selects either the first light-source lamp 26a or the second light-source lamp 26b to face the reading area 1a on the platen.

In addition, also with respect to the second carriage 28, as in the first carriage 3, the alignment position HPO, home position HP2 and reading start position H2 may be arranged in this order. In this case, the second carriage 28 moves from the home position to the alignment position, and further moves form the alignment position to the reading start position by being driven in the reverse direction, and the control is the same as in the first carriage 3.

Figure 5:
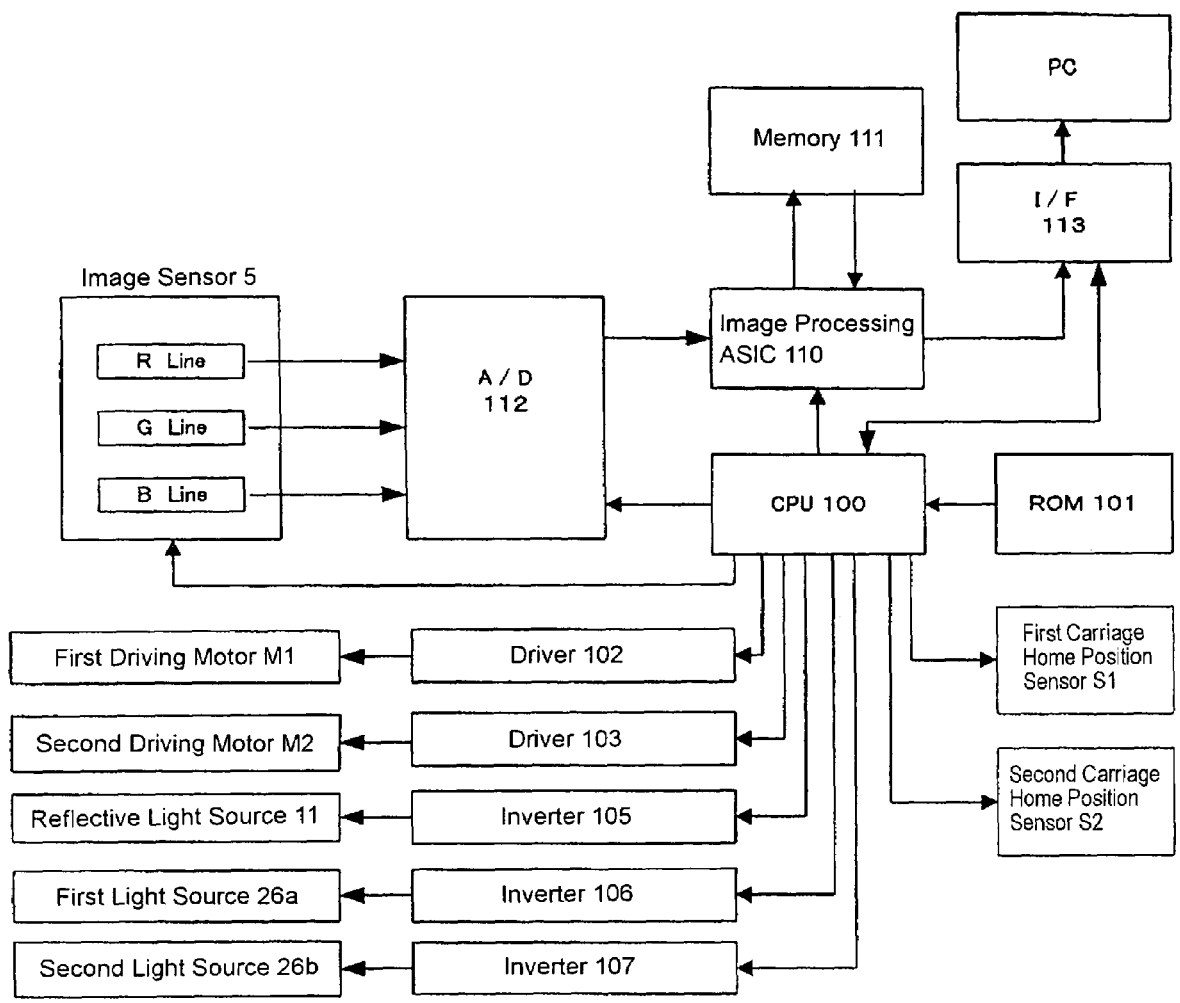
FIG. 5 is a block diagram illustrating a control circuit of the apparatus of FIG. 1.

A constitution of control of the driving motors will be described below based on FIG. 5. The image reading apparatus controls the entire apparatus by a CPU (control means) 100, and the CPU 100 is connected to a driving circuit 102 of the first driving motor M1 of the first carriage 3 and to a driving circuit 103 of the second driving motor M2 of the second carriage 28. Each of the driving circuits 102 and 103 is provided with a pulse generator to supply a pulse current respectively to driving motor M1 or M2 and with a counter that counts the pulse current, and is capable of controlling an amount of rotation of the motor with an instruction signal from the CPU 100. The home position sensors S1 and S2 of the first and second carriages 3 and 28 are coupled to the CPU 100, and convey whether or not the first and second carriages 3 and 28 are in home positions, respectively. The CPU 100 is further provided with storage means (ROM 101 as shown in the figure comprised of flash memory or the like), and the ROM 101 stores data to set an amount of movement of the second driving motor M2. As the data, for example, the number of driving pulses is stored corresponding to the amount of movement L1 or L2 of the second carriage 28.

Three inverters 105, 106 and 107 are connected to the CPU 100 so that the CPU lights or extinguishes the light-source lamps. The wiring is carried out so that the first inverter 105 supplies power to the reflective light source 11, the second inverter 106 supplies power to the negative lamp (first power-supply lamp) 26a, and that the third inverter 107 supplies power to the positive lamp (second light-source lamp) 26b.

Further, the CPU 100 is connected to the photoelectric sensor 5 to issue a signal to instruct data reading, and each of line sensors, R, G and B, of the photoelectric sensor 5 is connected to an image processing ASIC 110 via an A/D converter 112. Accordingly, image data subjected to photoelectric conversion in the photoelectric sensor 5 is output as an analog signal from each of the line sensors, R, G and B. The analog signal is subjected to gain/offset processing, converted into an 8-bit digital signal for each pixel in the A/D converter 112, and output to the image processing ASIC 110. Further, the image processing ASIC 110 performs various image processing such as shading correction, γ correction and color correction using memory 111, and outputs an image signal subjected to such image processing to a host computer PC as image data via I/F 113.

The operation will be described below according to FIG. 6. The aforementioned apparatus is configured to read either a non-transparent read object (referred to as a reflective original) or a translucent original (referred to as a transmissive original) set on the platen 1.

The case of reading the reflective original will be described first. Upon receiving a command indicative of a reflective original from a control panel provided in the image reading apparatus or a main body apparatus such as a computer, the CPU 100 lights the reflective light source 11 mounted on the first carriage 3. At this point, the reflective original is set on the platen 1 with the transmissive light source section B hinge-coupled to the scanner section A released upwardly. The CPU 100 maintains off of each light source of the light source unit 22 mounted on the second carriage 28. In this state, the CPU 100 controls driving of the first driving motor M1 to move the first carriage 3 rightward from the home position that is the left end in FIG. 1, and the photoelectric sensor 5 electrically reads light reflected from the original in the reading area 1a on the platen 1. Such operation is the same as in general scanners.

Figure 6:
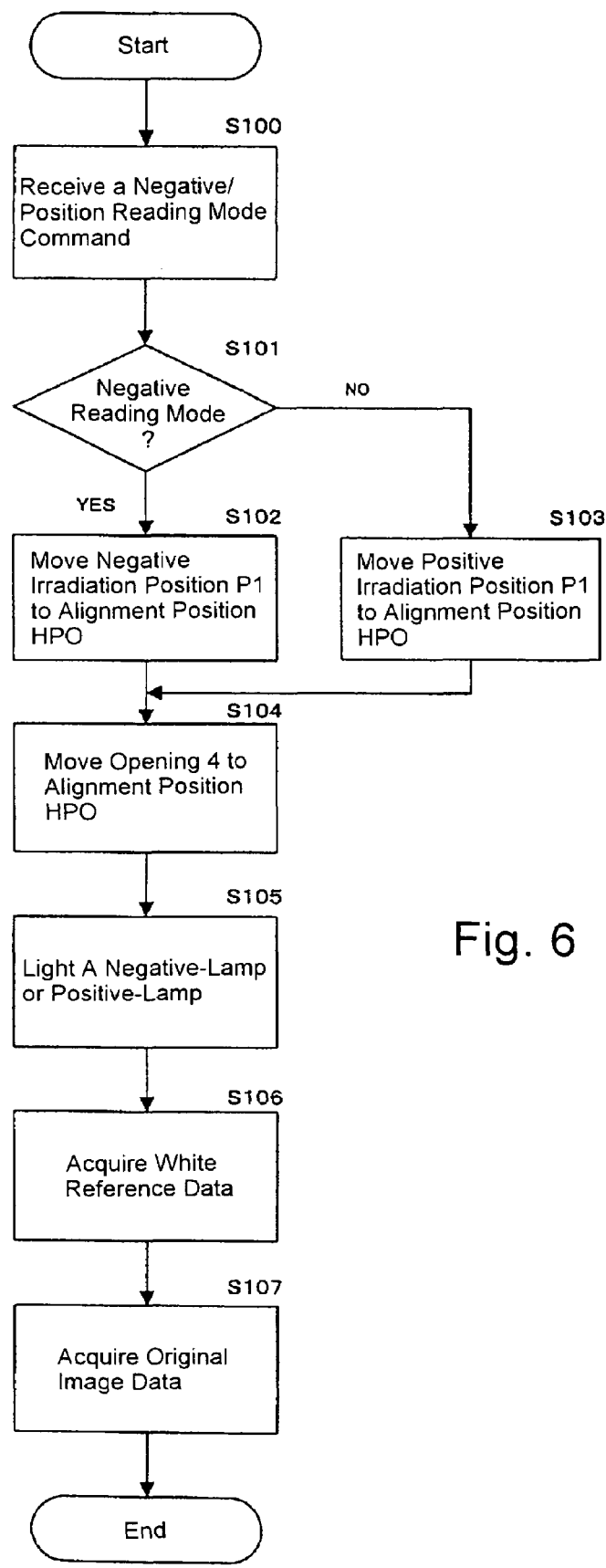
FIG. 6 is a flow diagram illustrating the operation of the apparatus of FIG. 1.

Reading of the transmissive original will be described according to the flow as shown in FIG. 6. Step 1 (S100)

An operator sets a transmissive original such as a photograph on the platen 1, for example, by placing the original on a dedicative holder. Then, the operator selects a reading mode for negative film original or positive film original on a control panel or a screen of a computer (PC), and at the same time, sets other reading conditions such as resolution. Then, the operator selects a reading start button. The PC outputs a reading mode command, and the CPU 100 receives the reading mode command via the I/F.

Step 1 (S101)

The CPU 100 determines whether the reading mode command is a negative reading mode command or a positive reading mode command, and at the same time, executes a predetermined control mode. In the control mode, a light source to use is first set including the reflective light source 11. The light source 11 is selected in the case of the reflective original reading mode, the light source 26a is selected in the case of the negative original reading mode, and the light source 26b is selected in the case of the positive original reading mode. Further, for example, reading speeds of the first and second carriages 3 and 28 are set corresponding to designation of monochrome, color, gray scale and the like, designation of resolution, and designation of conditions such as a concentration.

Step 2 (S102)

In the case of the negative reading mode, the second driving motor M2 is driven to move the second carriage 28 from the home position HP2 in the subscanning direction shown by the arrow Y in FIG. 3 by predetermined driving pulses (corresponding to the distance L1), the negative irradiation position P1 is positioned in the alignment position HPO, and the second driving motor M2 is halted. (see FIG. 3) In addition, the number of driving pulses of this case is read from the ROM 101. In other words, upon receiving the reading mode command designated corresponding to the original type, the CPU 100 reads the driving pulses corresponding to the negative original from ROM 101, and drives the second driving motor M2 corresponding to the pulses. At this point, the second carriage 28 is halted in a position the distance L1 apart from the home position HP2 as shown in FIG. 3.

Step 3 (S103)

In the case of the positive reading mode, the second driving motor M2 is driven to move the second carriage 28 from the home position HP2 in the subscanning direction shown by the arrow Y in FIG. 3 by predetermined driving pulses (corresponding to the distance L2), the positive irradiation position P2 is positioned in the alignment position HPO, and the second driving motor M2 is halted. (see FIG. 3) At this point, the second carriage 28 is halted in a position the distance L2 apart from the home position HP2 as shown in FIG. 3.

Step 4 (S104) The first driving motor M1 is driven to move the first carriage 3 from the home position HP1 in the direction shown by the arrow Z opposite to the subscanning direction by predetermined driving pulses so as to position the opening 4 in the alignment position HPO, and is halted. By this means, the opening 4 lies in the negative irradiation position P1 in the case of the negative reading mode, while lying in the positive irradiation position P2 in the case of the positive reading mode, and a predetermined output value is obtained in either case.

Step 5 (S105)

The negative-lamp (first light-source lamp) 26a is lighted in the case of the negative reading mode, while the positive-lamp (second light-source lamp) 26b is lighted in the case of the positive reading mode.

The CPU 100 drives the first and second driving motors M1 and M2 in synchronization with each other and moves both the carriages in the subscanning direction (the direction of the arrow Y in FIG. 3), while keeping the relative positional relationship set in step S102 or S103.

Step 6 (S106)

The photoelectric sensor 5 is driven while moving within a white reference data acquisition region (shown by W in FIG. 3) on the platen glass 1 so as to acquire white reference data for use in the shading correction.

Step 7 (S107)

In synchronized moving in the reading area 1a from the reading start position HS at a speed corresponding to the resolution and scaling factor, the photoelectric sensor 5 is driven to acquire image data of the original. After the acquisition, the image data is subjected to the image processing described earlier and transferred to the main body apparatus such as the computer.

In addition, while in this embodiment a plurality of light-source lamps, first and second light-source lamps, mounted on the second carriage are comprised of rod-shaped fluorescent lamps, but are not limited to such lamps. For example, the light-source lamps may be comprised of a light guide member extending in the main scanning direction and emission elements disposed in the end face of the light guide member. In other words, any light source may be used which extends linearly in the main scanning direction corresponding to the line sensor.

What is claimed is:

1. An image reading apparatus comprising:
a platen on which an original is mounted;
a line sensor that performs photoelectric conversion of a light from the original on the platen;
a first carriage that moves along the platen and guides the light from the original to the line sensor;
a first housing that stores and supports the first carriage to be movable along the platen;
first driving means for moving the first carriage;
a second carriage provided with a plurality of rod-shaped light-source lamps that apply light to the original, the lamps being spaced in parallel with one another in a moving direction of the second carriage;
a second housing that stores and supports the second carriage to be movable along the platen and covers the platen;
second driving means for moving the second carriage; and
control means for controlling the first driving means, the second driving means, and lighting of the plurality of light-source lamps,
wherein the control means selects one of the plurality of light-source lamps corresponding to a type of the original, and moves the first carriage from a standby position to a predetermined position, moves the second carriage from a standby position by an amount of movement set corresponding to the light-source lamp selected to position in the predetermined position, and moves the first carriage and the second carriage at the same speed from the predetermined position to a reading start position of the original.

2. The image reading apparatus according to claim 1, wherein the control means controls movements of the second carriage so that the second carriage moves in one direction along the platen from the standby position to the reading start position via the predetermined position, and positions one of the plurality of light-source lamps in a predetermined position by an amount of movement from the standby position to the predetermined position.

3. The image reading apparatus according to claim 1, wherein the control means controls movements of the second carriage so that the second carriage moves from the standby position to the predetermined position in one direction along the platen, and then, moves from the predetermined position to the reading start position along the platen in the opposite direction, and positions one of the plurality of light-source lamps in a predetermined position by an amount of movement from the standby position to the predetermined position.

4. The image reading apparatus according to claim 1, wherein the second carriage is provided with a plurality of lamp storing portions divided by partition walls to respectively store the plurality of light-source lamps, and each of the plurality of lamp storing portions is provided with a reflecting plate that diffusely reflects light of a respective light-source lamp and with an opening to project the light toward the platen.

5. The image reading apparatus according to claim 1, wherein the plurality of light-source lamps includes at least a light-source lamp for negative film and a light-source lamp for positive film.

6. The image reading apparatus according to claim 5, wherein in the light-source lamp for negative film, amounts of light with wavelengths for R, G and B are set so that R:G:B=1:2:3 in output values of the line sensor, while in the light-source lamp for positive film, amounts of light with wavelengths for R, G and B are set so that R:G:B=1:1:1 in output values of the line sensor.

7. The image reading apparatus according to claim 1, wherein in a process for moving the first carriage and the second carriage from the predetermined position to the reading staff position, the control means makes the line sensor acquire a reference reading signal.

8. The image reading apparatus according to any one of claim 1 to 7, wherein the first driving means and the second driving means are provided with respective driving motors, the control means is comprised of a central control circuit, driving circuits for the driving motors, and a power source control circuit for the plurality of light-source lamps, and the central control circuit is provided with storage means for storing amounts of the movement to move the second carriage from the standby position to the predetermined position corresponding to the plurality of light-source lamps.

* * * * *